March 20, 1951 G. F. HAUF 2,546,096
CONSTRUCTION OF FLEXIBLE PIPE COUPLINGS
Filed Sept. 25, 1946 3 Sheets-Sheet 1

INVENTOR.
GEORGE F. HAUF
BY
Harry H. Hitzeman
ATTORNEY.

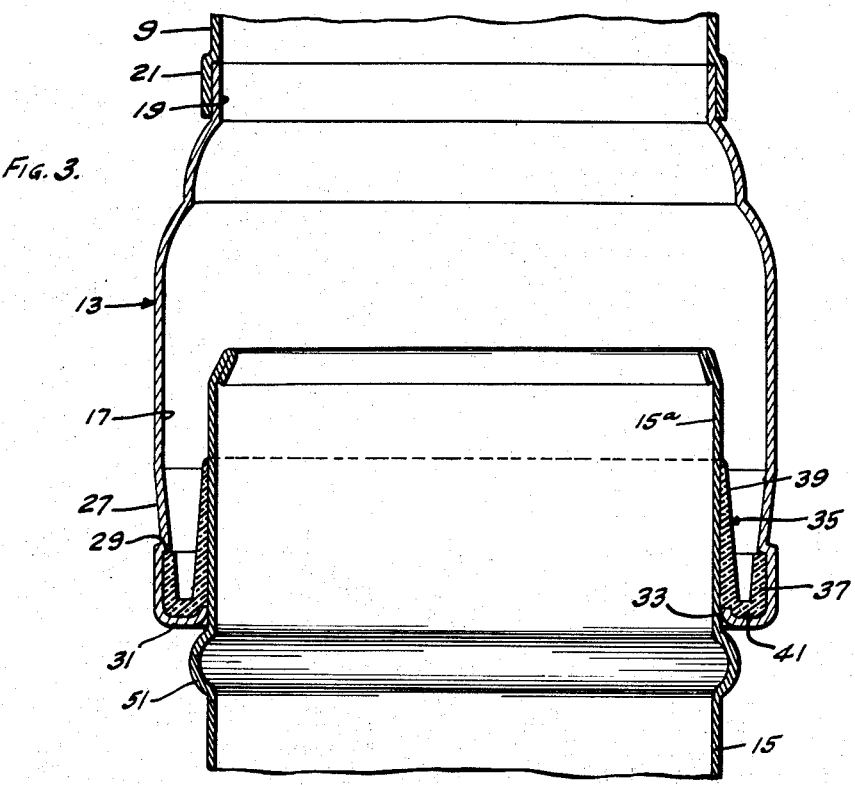
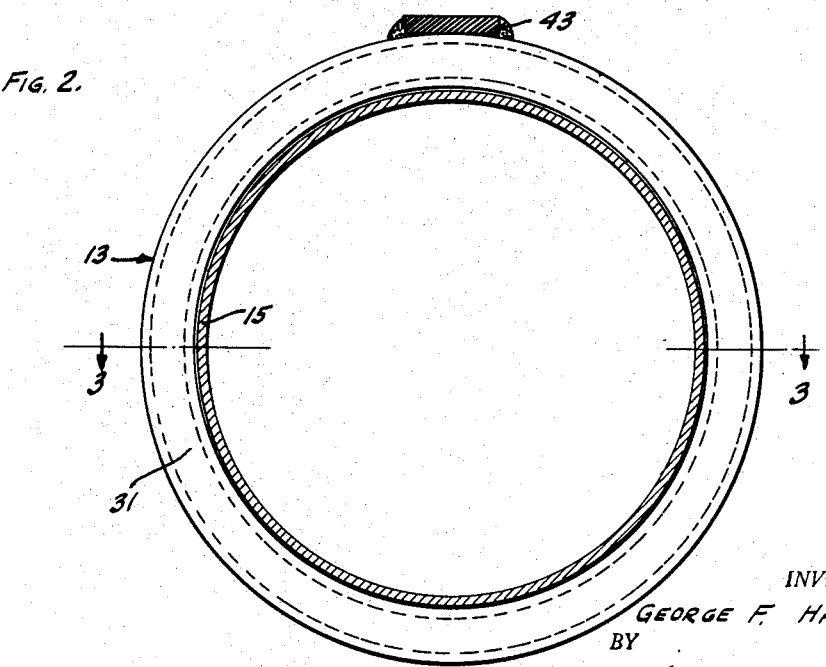

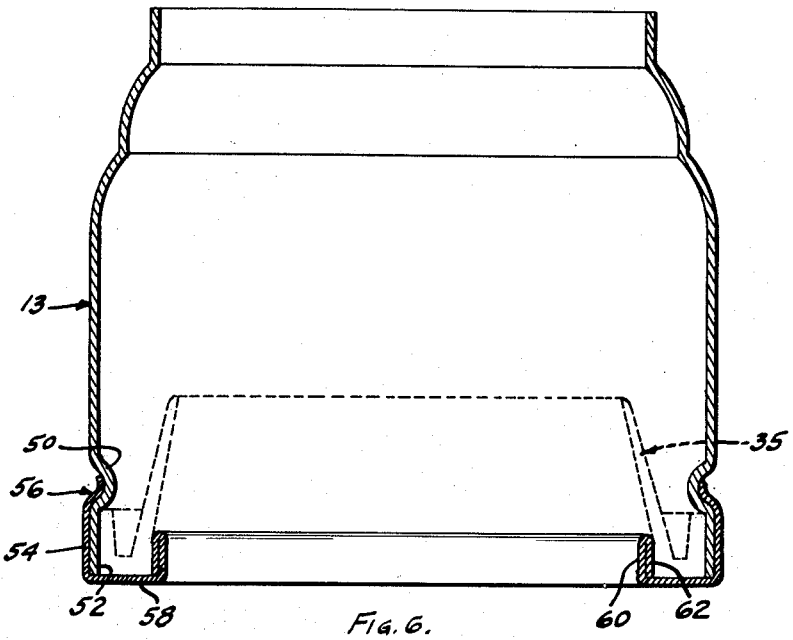
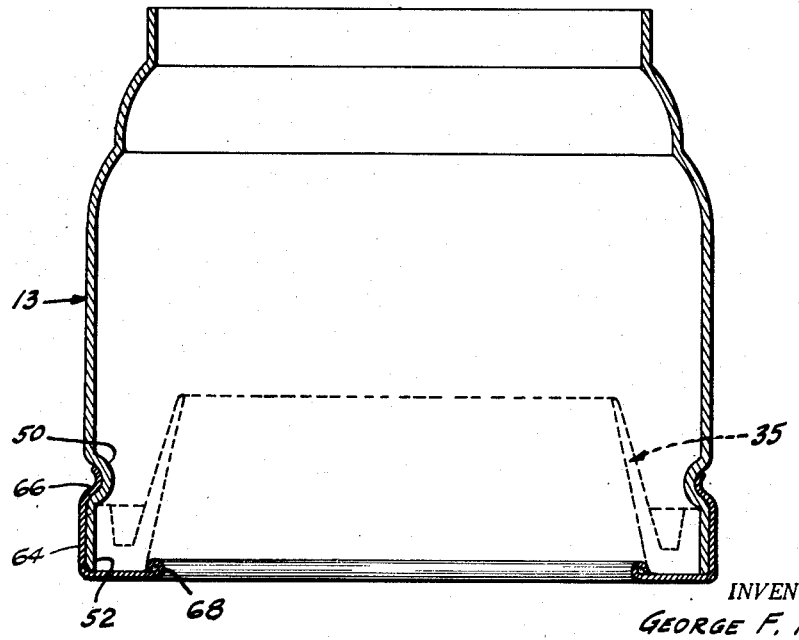
INVENTOR.
GEORGE F. HAUF
BY Harry H. Hitzeman
ATTORNEY.

Patented Mar. 20, 1951

2,546,096

UNITED STATES PATENT OFFICE 2,546,096

CONSTRUCTION OF FLEXIBLE PIPE COUPLINGS

George F. Hauf, River Forest, Ill., assignor to Chicago Metal Mfg. Co., Chicago, Ill., a corporation of Illinois Application September 25, 1946, Serial No. 699,214

1 Claim. (Cl. 285—196)

My invention relates to improvements in flexible pipe joints or couplings and an improved method of manufacturing the same; and more particularly to flexible pipe joints or couplings adapted to connect together lengths of irrigation piping.

Piping for irrigation purposes is ordinarily constructed of sheet metal such as galvanized iron in suitable lengths having coupler elements on both ends, usually a male coupling member on one end and a female coupling member on the other, so that they may be telescopically joined by some quick detachable means, the coupling members also usually permitting limited angular misalignment of the piping to follow the surface terrain of the land to be irrigated. Since such piping is frequently disassembled and moved to new locations from time to time, it follows that the coupler and quick detachable means must, of necessity, be as simple and easy to operate as possible, yet be rugged and durable so that the same will not easily become broken or out of order. Further, since the flexible joints must be fluid proof and capable of withstanding comparatively high pressures, special attention should be given to the construction of the same.

The principal object of the present invention is to provide in piping of the type described, an improved type of coupling means.

A further object of the invention is to provide an improved process of manufacturing pipe coupling members of the type described.

A further object of the invention is to provide prefabricated male and female connector members capable of connection to lengths of pipe of any description, so that when an order for irrigation piping is received the pipe may be cut to the desired lengths, the connector members attached thereto and the complete piping is ready to be shipped.

A further object of the invention is to provide in combination with my improved connector members an improved reinforced collar and means of constructing the same, so that it is capable of maintaining a sealed connection under unusually high pressures and in any angular alignment of the pipe sections.

Other objects and advantages will be more apparent from the following description wherein reference is had to the accompanying two sheets of drawings, upon which Fig. 1 is a plan view of my improved coupler member showing a pair of pipe sections connected thereby;

Fig. 2 is a cross sectional view thereof taken generally on the line 2—2 of Fig. 1;

Fig. 3 is a cross sectional view taken on the line 3—3 of Fig. 2;

Fig. 5 is a similar sectional view of a further modified form of coupler and gasket; and Fig. 6 is a similar sectional view of a still further modified form of coupler.

Figure 1:
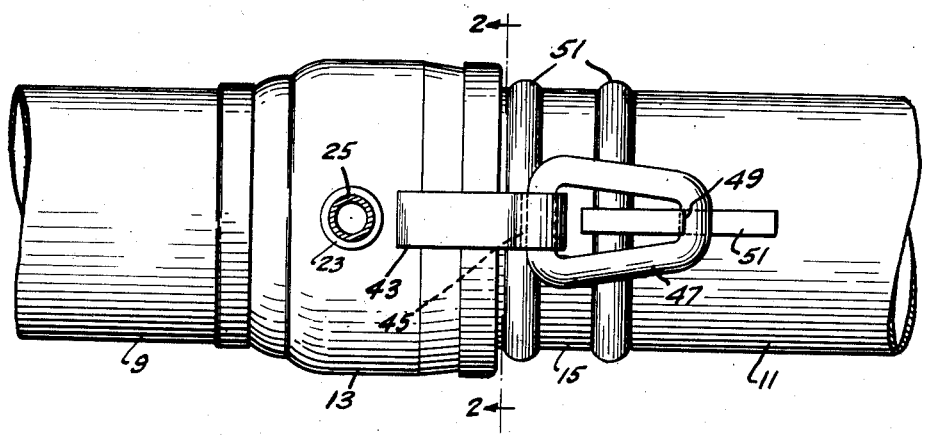

In the embodiment of the invention which I have chosen to illustrate, in Fig. 1, I have shown a pair of pipe sections 9 and 11 of any suitable or desirable length having associated therewith the female coupler member 13 and the male coupler member 15 respectively. The pipes 9 and 11, while they may be formed of any desirable material such as cast iron, wrought iron, sheet metal or plastic, are preferably formed of a comparatively thin galvanized sheet metal piping that is formed from flat material shaped about a mandrel to the desired diameter with the edges welded together in a suitable manner.

A coupler member 13 may be formed with a cylindrical portion 17 having a forward end 19 adapted to be inserted into the forward end of pipe 9 and securely welded to the portion 21 thereof. A boss 23 may be mounted upon the top of the coupler member 13 formed with a tapped bore to receive a vertical sprinkling header 25. The wall of the portion 17 is preferably formed with an inwardly directed portion 27 to form a shoulder 29 at a point spaced from the end 31 of the same.

In order to reinforce the opened end of the coupler 13, I provide a turned-in portion 33 which forms a more rigid and reinforced opening through which the forward portion 15a of the coupler member 15 is inserted.

To provide an effective seal to prevent leakage of fluid between the male and female coupling members, I provide a generally V-shaped gasket member 35 formed with two annular diverging lip portions 37 and 39 which extend from a thickened apex portion 41. The lip 37 fits against the inner face of the female coupler member 13, being of such size that its extended edge will bear against the annular shoulder 29 with the apex portion 41 fitting snugly against the turned-in front wall of the coupler which forms the reinforced opening 33. The lip 39 is of a tapered or conical form, which is adapted to be stretched when the pipes are connected together to permit the insertion of the end 15a of the male coupler member 15. When the pipe sections are connected together by the use of two couplings described and the gasket which I have provided, the gasket is thus stretched about the male coupler member and a liquid tight joint is effected. In addition, when water or other fluid under pressure is passing through the pipe line, it bears against the inner and outer lips of the gasket, pressing them against the surface against which they are resting and, as a consequence, the pressure in the pipe line assists in keeping the gasket in a liquid tight sealing joint. Due to the resiliency of the material of which the gasket member is constructed, it can be seen that the coupler member 15 can be angularly moved with relation to coupler 13 within limits and an effective seal will nevertheless always be kept between the engaging parts.

To pivotally connect the pipes 9 and 11 together, and prevent their disengagement in use, I have provided a strap member 43 that is welded or otherwise secured to the coupler member 13. This strap is formed with a circular opening 45 to receive a link member 47. The link member 47 is adapted to latch over a shoulder 49 of block 51 welded or otherwise secured to the pipe member 10.

This construction may be generally similar to that shown in my co-pending application for patent, S. N. 684,304, now Patent No. 2,508,716, and will not be described in more detail herein. It will suffice to point out that the pipes 9 and 11 may be disconnected by using a hook to reach under the edge of link 47 and pull the same upwardly. The reinforcing grooves 51 of the male coupler member 15 are normally sufficiently spaced from the entrance to the female coupler 17, so that inward motion may be obtained to raise the link 47.

In order to assemble together sections of irrigation pipe provided with my improved male and female coupler members, the male member is inserted through the gasket 35 a sufficient distance so that the link 47 can be dropped over the upper edge of the shoulder 49 of the block 51 on the pipe 11. When fluid under pressure is placed in the pipe line, the fluid will have a tendency not only to force the lips of the gasket against the surfaces which they contact, but it will also serve to push the end of the coupler 15 outwardly, so that the link 47 is frictionally held against the shoulder 49 of the block 51. When it is desired to disconnect the pipe sections, this is accomplished by hooking under an arm of the link 47 and pulling upwardly.

With the construction of the female coupler member which I have shown, it can be seen that the curling in of the edge 33 of the front wall of the same provides not only a reinforcement at the opening, but also a seat for the gasket member 35. I have found that with this construction the breaking, bending or distortion of the opening of the female coupler member, due to rough handling or frequent usage, is largely eliminated.

Figure 4:
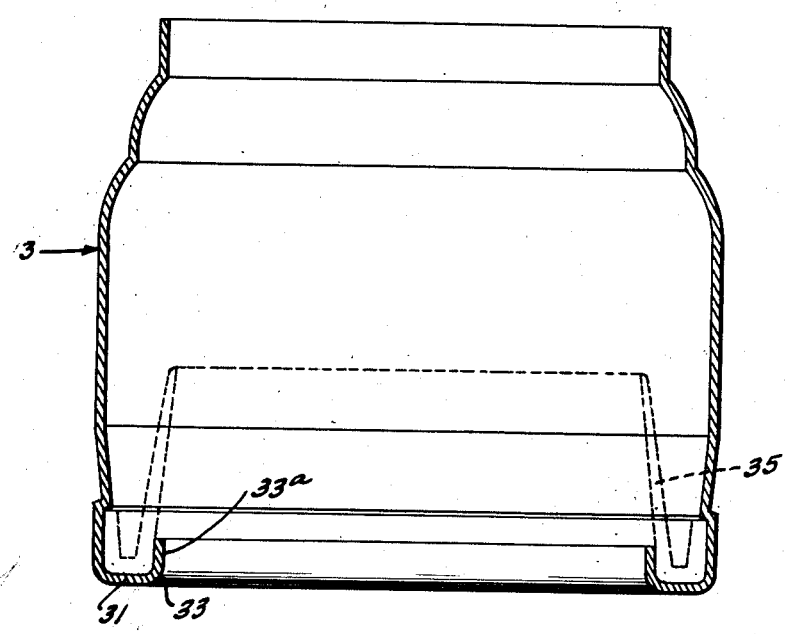
Fig. 4 is a cross sectional view of a modified form of coupler member wherein the gasket is shown in dotted outline.

In Fig. 4 of the drawings, I have shown a modified form of the coupler member 13 wherein the forward wall 31 has a curled in portion 33 and a continuation forming an annular circular shoulder 33a. With this construction, I provide a more effective seat for the gasket 35 in that it is securely held upon three sides adjacent to its apex. In addition, I have provided additional reinforcement about the opening for the insertion of the male coupler member.

In the embodiment of the invention shown in Fig. 5, I have shown the female coupler member 13 provided with an annular groove 50 spaced from the opened end 52 of the same. I provide a collar member 54 having a portion 56 curled inwardly to seat in the groove 50. The collar member 54 may be formed with a forward wall 58 and an inwardly turned lip portion 60 which has a turned back flange 62 to reinforce the same. With this construction the apex of the gasket 35 is also provided with a seat upon three sides of the same.

In the embodiment of the invention shown in Fig. 6, I have provided a similar collar member 64 which is provided with a curled in portion 66 that is spun into the groove 50 to seat the collar over the open end 52 of the coupler. In this construction, the collar is provided with a male coupler receiving opening 68 that is reinforced by curling in the edge of the same, as shown.

In the foregoing specification I have illustrated and described several forms of reinforcing structure for the male coupler receiver opening of the female coupler. When the size of the piping to which the coupler is attached is small, it is sometimes desirable to provide the collars shown and described as a reinforcement for the opening, due to the comparatively small thickness of the sheet metal used. In larger size piping and couplers therefor, it is often possible to form the opened end of the female coupler as shown without the use of a reinforcing collar. This is advisable when the thickness of the metal used is sufficiently great to provide sufficient strength when reinforced, so that the opening will not be broken.

While I have illustrated and described a specific embodiment of the invention, it will be apparent to those skilled in the art that I have provided effective coupler members for pipe sections and I do not wish to be limited in any particular; rather what I desire to secure and protect by Letters Patent of the United States is:

The combination with male and female pipe members constructed of thin sheet metal of an enlarged cylindrical collar member secured to the end of said female pipe member, said collar member being constructed of thin sheet metal and having an open circular end, an inwardly turned circular ridge formed therein adjacent to and parallel with said open end, a circular U-shaped cap telescopically mounted over the open end of said collar member and fastened thereto by having the edge of one of its legs turned down into the groove formed by said inwardly turned circular ridge, said cap having a front wall and its other leg formed by a circular inwardly extending portion, said portion having a turned-back flange to reinforce the same and a resilient V-shaped gasket mounted in and against the inner surface of said collar member and having one leg positioned between said circular ridge and the front wall portion of said cap, said gasket having a portion seated against said front wall portion and a portion seated against the inwardly extending lip portion whereby the apex of the gasket is provided with a seat on three sides.

GEORGE F. HAUF.

REFERENCES CITED

The following references are of record in the file of this patent:

UNITED STATES PATENTS

| Number | Name | Date |
|---|---|---|
| 1,819,007 | Smith | Aug. 18, 1931 |
| 1,875,130 | Peck | Aug. 30, 1932 |
| 2,066,008 | Knoerzer | Dec. 29, 1936 |
| 2,278,074 | Hauf | Mar. 31, 1942 |